United States Patent
Zheng et al.

(10) Patent No.: US 11,620,082 B2
(45) Date of Patent: Apr. 4, 2023

(54) DATA RETRIEVAL METHOD AND APPARATUS

(71) Applicant: HUAWEI TECHNOLOGIES CO., LTD., Guangdong (CN)

(72) Inventors: Fangzhou Zheng, Shenzhen (CN); Jian Gao, Hangzhou (CN); Chunhui Ma, Hangzhou (CN)

(73) Assignee: HUAWEI TECHNOLOGIES CO., LTD., Guangdong (CN)

(*) Notice: Subject to any disclaimer, the term of this patent is extended or adjusted under 35 U.S.C. 154(b) by 0 days.

(21) Appl. No.: 17/206,903

(22) Filed: Mar. 19, 2021

(65) Prior Publication Data
US 2021/0208818 A1    Jul. 8, 2021

Related U.S. Application Data

(63) Continuation of application No. PCT/CN2019/094378, filed on Jul. 2, 2019.

(30) Foreign Application Priority Data

Sep. 21, 2018   (CN) .................. 201811106483.8

(51) Int. Cl.
   *G06F 3/06*   (2006.01)
   *G06F 12/06*  (2006.01)

(52) U.S. Cl.
   CPC .......... *G06F 3/0659* (2013.01); *G06F 3/0611* (2013.01); *G06F 3/0673* (2013.01); *G06F 12/0646* (2013.01); *G06F 2212/1008* (2013.01)

(58) Field of Classification Search
   CPC .... G06F 3/0659; G06F 3/0611; G06F 3/0673; G06F 12/0646; G06F 2212/1008; G06F 2209/5017; G06F 16/2453
   See application file for complete search history.

(56) References Cited

U.S. PATENT DOCUMENTS

8,904,091 B1 * 12/2014 Guda ............... G06F 3/061
                                                711/172
2008/0091908 A1  4/2008 Bhattacharjee et al.
(Continued)

FOREIGN PATENT DOCUMENTS

CN   101075233 A   11/2007
CN   102436513 A   5/2012
(Continued)

OTHER PUBLICATIONS

Rubao Lee et al.,"Request Window: an approach to improve throughput of RDBMS-based data integration system by utilizing data sharing across concurrent distributed queries",Sep. 23, 2007,total: 12pages.

*Primary Examiner* — Zhuo H Li
(74) *Attorney, Agent, or Firm* — Womble Bond Dickinson (US) LLP

(57) ABSTRACT

This application provides a data reading method for a retrieval task and a retrieval apparatus. The method includes receiving a first retrieval task request, where the first retrieval task request corresponds to a first retrieval start address and a first retrieval end address in a target data area, and reading data for a first retrieval task starting from the first retrieval start address. The method includes receiving a second retrieval task request in a process of reading data for the first retrieval task. The method further includes obtaining an address of data to be read for the first retrieval task after receiving the second retrieval task request, and determining a second retrieval start address of a second retrieval task in the target data area based on the address of the data to be read. The method further includes reading data for the second retrieval task starting from the second retrieval start address.

20 Claims, 12 Drawing Sheets

(56) References Cited

U.S. PATENT DOCUMENTS

| | | | | |
|---|---|---|---|---|
| 2012/0227051 | A1* | 9/2012 | Craik | G06F 9/4881 |
| | | | | 718/104 |
| 2012/0239968 | A1* | 9/2012 | Ogawa | G06F 11/0793 |
| | | | | 714/E11.089 |
| 2015/0347027 | A1* | 12/2015 | Lu | G11C 8/04 |
| | | | | 711/103 |
| 2015/0372966 | A1* | 12/2015 | Seth | H04W 4/021 |
| | | | | 709/224 |
| 2020/0081654 | A1* | 3/2020 | Chan | G06F 3/0679 |

FOREIGN PATENT DOCUMENTS

| | | |
|---|---|---|
| CN | 103516536 A | 1/2014 |
| CN | 104662538 A | 5/2015 |
| CN | 105224480 A | 1/2016 |
| CN | 105808560 A | 7/2016 |
| CN | 106598877 A | 4/2017 |
| CN | 107180113 A | 9/2017 |

* cited by examiner

| Retrieval task | Retrieval module | Start address | End address |
|---|---|---|---|
| QPS0 | 0 | START0 | END0 |
| QPS1 | 1 | START1 | END1 |
| QPS2 | 2 | START2 | END2 |

FIG. 6

DATA RETRIEVAL METHOD AND APPARATUS

CROSS-REFERENCE TO RELATED APPLICATIONS

This application is a continuation of International Application No. PCT/CN2019/094378, filed on Jul. 2, 2019, which claims priority to Chinese Patent Application No. 201811106483.8, filed on Sep. 21, 2018. The disclosures of the aforementioned applications are hereby incorporated by reference in their entireties.

TECHNICAL FIELD

This application relates to the field of data processing, and in particular, to a data reading method and a related device when a data processing task is performed.

BACKGROUND

Currently, in an era of rapid development of the Internet, scenarios of high-concurrency services continuously increase. How to improve efficiency of processing high-concurrency services has become one of hot issues that are currently focused on. Many existing services require reading and analysis processing of a large amount of data. For example, for a retrieval service, data in a database needs to be traversed and analyzed to determine a correlation between the data and a retrieval request, and finally a retrieval result is output. If there are high-concurrency retrieval services, data in a database needs to be traversed for multiple times according to different retrieval requests. In the prior art, a processing method of a retrieval service is to read data from a database, and perform retrieval calculation based on the data that is read for multiple times, until all data in the database is traversed. Then, a retrieval task ends and a retrieval result are returned. If another retrieval request is received in a process of performing a retrieval service, in this case, data reading and retrieval calculation for a next retrieval task usually need to be performed from the beginning after the first retrieval task is completed.

Therefore, it can be learned that a problem of a long retrieval delay exists in an existing service processing solution. When there are a plurality of concurrent services in a type of services requiring to read a large amount of data, for example, retrieval services, how to improve service processing efficiency and reduce a delay becomes an urgent problem to be resolved.

SUMMARY

Embodiments of this application provide a data reading method and apparatus to improve concurrent data reading efficiency and reduce a service processing delay when a plurality of services is concurrently performed.

According to a first aspect, this application provides a data reading method for a retrieval task, including: receiving a first retrieval task request, where the first retrieval task request corresponds to a first retrieval start address and a first retrieval end address in a target data area; reading data for a first retrieval task starting from the first retrieval start address, where the data reading for the first retrieval task is sequentially reading data in the target data area from the first retrieval start address to the first retrieval end address; receiving a second retrieval task request in a process of reading data for the first retrieval task; determining a second retrieval start address of a second retrieval task in the target data area based on an address of data to be read for the first retrieval task, where the second retrieval start address falls in a range from the address of the data to be read for the first retrieval task to the first retrieval end address; and reading data for the second retrieval task starting from the second retrieval start address, where the target data area is a range of data that needs to be traversed when retrieval is performed for both the first retrieval task and the second retrieval task.

It can be learned that a data reading location of an ongoing first retrieval task is obtained and used as a reference, to locate a retrieval start location of a newly initiated retrieval task, and data reading for the retrieval task initiated after the first retrieval task does not need to be performed until the data reading for the first retrieval task is completed. Therefore, a plurality of concurrent tasks can simultaneously read data to improve data reading efficiency, reduce service waiting time, and reduce a service processing delay.

In one embodiment, the target data area may be traversed from the first retrieval start address to the first retrieval end address.

In one embodiment, after the determining a second retrieval start address of a second retrieval task in the target data area based on an address of data to be read for the first retrieval task, the method further includes: continuing to read data starting from the address of the data to be read for the first retrieval task, and determining whether an address of the read data is the second retrieval start address, where if the address of the read data is the second retrieval start address, the read data is used to perform the second retrieval task.

In one embodiment, where after the determining a second retrieval start address of a second retrieval task in the target data area based on an address of data to be read for the first retrieval task, the method further includes: continuing to read data starting from the address of the data to be read for the first retrieval task, and determining whether an address of the read data is the first retrieval end address, where if the address of the read data is not the first retrieval end address, the read data is further used to perform the first retrieval task.

In one embodiment, where after the determining a second retrieval start address of a second retrieval task in the target data area based on an address of data to be read for the first retrieval task, the method further includes: continuing to read data starting from the address of the data to be read for the first retrieval task, and determining whether an address of the read data is the first retrieval end address, where if the address of the read data is the first retrieval end address, the read data is used to stop the first retrieval task after performing the first retrieval task.

A retrieval task to which the read data belongs is determined, and the read data can be simultaneously used in a plurality of concurrent retrieval tasks, to improve data reading efficiency.

In one embodiment, the determining a second retrieval start address of a second retrieval task in the target data area based on an address of data to be read includes: determining the second retrieval start address and a second retrieval end address of the second retrieval task in the target data area based on the address of the data to be read.

In one embodiment, the target data area may be traversed from the second retrieval start address to the second retrieval end address.

A start data reading location and an end data reading location of the retrieval task can be more accurately determined by setting a retrieval start address and a retrieval end address. This improves data reading efficiency and retrieval task execution efficiency, and avoids repeated data reading or omission of unread data.

In one embodiment, the determining a second retrieval start address of a second retrieval task in the target data area based on an address of data to be read includes: setting the address of the data to be read as the second retrieval start address.

In one embodiment, the determining the second retrieval start address and a second retrieval end address of the second retrieval task in the target data area based on the address of the data to be read includes: setting a previous data address of the address of the data to be read as the second retrieval end address.

The data to be read is set as the second retrieval start address, so that waiting time of a newly initiated retrieval task can be minimized, and the new retrieval task can be performed in time.

In one embodiment, the target data area includes a plurality of data blocks, and each data block includes a plurality of data units.

In one embodiment, the target data area includes a plurality of data units.

The address is a data block address or a data unit address.

A start location and an end location of data reading are identified by using a data block address or a data unit address, so that whether data reading of each task is completed can be accurately determined when data reading of a plurality of tasks is concurrently performed.

According to a second aspect, this application provides a retrieval method, including: receiving a first retrieval task request, where the first retrieval task request corresponds to a first retrieval start address and a first retrieval end address in a target data area; reading data for a first retrieval task starting from the first retrieval start address; where the data reading for the first retrieval task is sequentially reading data in the target data area from the first retrieval start address to the first retrieval end address; receiving a second retrieval task request in a process of reading data for the first retrieval task; determining a second retrieval start address of a second retrieval task in the target data area based on an address of data to be read for the first retrieval task; where the second retrieval start address may fall in a range from the address of the data to be read for the first retrieval task to the first retrieval end address; reading data in the target data area; and determining a retrieval task corresponding to the read data, and performing retrieval based on the corresponding retrieval task.

In one embodiment, data is read for the second retrieval task starting from the second retrieval start address.

In one embodiment, the target data area is a range of data that needs to be traversed when retrieval is performed for both the first retrieval task and the second retrieval task.

A data reading location of an ongoing first retrieval task is obtained and used as a reference to locate a retrieval start location of a newly initiated retrieval task, and data reading for the retrieval task initiated after the first retrieval task does not need to be performed until the data reading for the first retrieval task is complete. Therefore, a plurality of concurrent tasks can simultaneously read data to improve data reading efficiency, reduce service waiting time, and reduce a service processing delay.

In one embodiment, the target data area may be traversed from the first retrieval start address to the first retrieval end address.

In one embodiment, the determining a retrieval task corresponding to the read data further includes: determining whether an address of the read data is the second retrieval start address, where if the address of the read data is the second retrieval start address, the read data is used to perform the second retrieval task.

In one embodiment, the determining a retrieval task corresponding to the read data further includes: determining whether an address of the read data is the first retrieval end address, where if the address of the read data is not the first retrieval end address, the read data is used to perform the first retrieval task.

A retrieval task to which the read data belongs is determined, and the read data can be simultaneously used in a plurality of concurrent retrieval tasks, to improve data reading efficiency.

In one embodiment, the determining a second retrieval start address of a second retrieval task in the target data area based on an address of data to be read includes: determining the second retrieval start address and a second retrieval end address of the second retrieval task in the target data area based on the address of the data to be read.

In one embodiment, the target data area may be traversed from the second retrieval start address to the second retrieval end address.

In one embodiment, after a retrieval end address of a retrieval task is read, a retrieval start address mark and a retrieval end address mark of the retrieval task are deleted.

A start data reading location and an end data reading location of the retrieval task can be more accurately determined by setting a retrieval start address and a retrieval end address. This improves data reading efficiency and retrieval task execution efficiency, and avoids repeated data reading or omission of unread data.

In one embodiment, the determining a second retrieval start address of a second retrieval task in the target data area based on an address of data to be read includes: setting the address of the data to be read as the second retrieval start address.

In one embodiment, the determining the second retrieval start address and a second retrieval end address of the second retrieval task in the target data area based on the address of the data to be read includes: setting a previous data address of the address of the data to be read as the second retrieval end address.

The data to be read is set as the second retrieval start address, so that waiting time of a newly initiated retrieval task can be minimized, and the new retrieval task can be performed in time.

In one embodiment, the target data area includes a plurality of data blocks, and each data block includes a plurality of data units.

In one embodiment, the target data area includes a plurality of data units.

The address is a data block address or a data unit address.

A start location and an end location of data reading are identified by using a data block address or a data unit address, so that whether data reading of each task is completed can be accurately determined when data reading of a plurality of tasks is concurrently performed.

According to a third aspect, this application further discloses a data retrieval apparatus, where the apparatus includes: an interface module, configured to receive a first retrieval task request, and receive a second retrieval task request in a process of reading data for a first retrieval task, where the first retrieval task request corresponds to a first retrieval start address and a first retrieval end address in a target data area; a location setting module, configured to, after the interface module receives the second retrieval task request, determine a second retrieval start address of a second retrieval task in the target data area based on an address of data to be read for the first retrieval task, where the second retrieval start address falls in a range from the address of the data to be read for the first retrieval task to the first retrieval end address; and a data reading module, configured to: read data for the first retrieval task starting from the first retrieval start address, and read data for a second retrieval task starting from the second retrieval start address determined by the location setting module; where the data reading for the first retrieval task is sequentially reading data in the target data area from the first retrieval start address to the first retrieval end address, and the target data area is a range of data that needs to be traversed when retrieval is performed for both the first retrieval task and the second retrieval task.

A data reading location of an ongoing first retrieval task is obtained and used as a reference to locate a retrieval start location of a newly initiated retrieval task, and data reading for the retrieval task initiated after the first retrieval task does not need to be performed until the data reading for the first retrieval task is complete. Therefore, a plurality of concurrent tasks can simultaneously read data to improve data reading efficiency, reduce service waiting time, and reduce a service processing delay.

In one embodiment, the data reading module is further configured to determine whether an address of the read data is the second retrieval start address, where if the address of the read data is the second retrieval start address, the read data is used to perform the second retrieval task.

In one embodiment, the data reading module is further configured to determine whether an address of the read data is the first retrieval end address, where if the address of the read data is not the first retrieval end address, the read data is used to perform the first retrieval task.

A retrieval task to which the read data belongs is determined, and the read data can be simultaneously used in a plurality of concurrent retrieval tasks, to improve data reading efficiency.

In one embodiment, the apparatus further comprises a retrieving module, configured to perform retrieval based on the data read by the data reading module and a retrieval task corresponding to the read data.

A start data reading location and an end data reading location of the retrieval task can be more accurately determined by setting a retrieval start address and a retrieval end address. This improves data reading efficiency and retrieval task execution efficiency, and avoids repeated data reading or omission of unread data.

According to a fourth aspect, this application further discloses a data retrieval system, where the system includes a data retrieval apparatus and a memory; the memory is configured to store data required by a retrieval task, and the retrieval task of the data retrieval system needs to traverse the data in the memory; and the data retrieval apparatus is configured to receive a first retrieval task request, where the first retrieval task request corresponds to a first retrieval start address and a first retrieval end address in the memory; read data for a first retrieval task starting from the first retrieval start address, where the data reading for the first retrieval task is sequentially reading data in a target data area from the first retrieval start address to the first retrieval end address; receive a second retrieval task request in a process of reading data for the first retrieval task; obtain an address of data to be read for the first retrieval task after receiving the retrieval request; determine a second retrieval start address of a second retrieval task in the memory based on the address of the data to be read for the first retrieval task, where the second retrieval start address falls in a range from the address of the data to be read for the first retrieval task to the first retrieval end address; and read data for the second retrieval task starting from the second retrieval start address.

A data reading location of an ongoing first retrieval task is obtained and used as a reference to locate a retrieval start location of a newly initiated retrieval task, and data reading for the retrieval task initiated after the first retrieval task does not need to be performed until the data reading for the first retrieval task is complete. Therefore, a plurality of concurrent tasks can simultaneously read data to improve data reading efficiency, reduce service waiting time, and reduce a service processing delay.

According to a fifth aspect, this application further discloses a data retrieval apparatus, including one or more processors and a memory; the memory is configured to store data required for a retrieval task, and the retrieval task needs to traverse the data in the memory; the one or more processors are configured to receive a first retrieval task request, where the first retrieval task request corresponds to a first retrieval start address and a first retrieval end address in the memory; read data for a first retrieval task starting from the first retrieval start address, where the data reading for the first retrieval task is sequentially reading data in the target data area from the first retrieval start address to the first retrieval end address; receive a second retrieval task request in a process of reading data for the first retrieval task; determine a second retrieval start address of a second retrieval task in the memory based on an address of data to be read for the first retrieval task, where the second retrieval start address falls in a range from the address of the data to be read for the first retrieval task to the first retrieval end address; and read data for the second retrieval task starting from the second retrieval start address.

A data reading location of an ongoing first retrieval task is obtained and used as a reference to locate a retrieval start location of a newly initiated retrieval task, and data reading for the retrieval task initiated after the first retrieval task does not need to be performed until the data reading for the first retrieval task is complete. Therefore, a plurality of concurrent tasks can simultaneously read data to improve data reading efficiency, reduce service waiting time, and reduce a service processing delay.

In one embodiment, the one or more processors are further configured to determine whether an address of the read data is the second retrieval start address, where if the address of the read data is the second retrieval start address, the read data is used to perform the second retrieval task.

In one embodiment, the one or more processors are further configured to determine whether an address of the read data is the first retrieval end address, where if the address of the read data is not the first retrieval end address, the read data is used to perform the first retrieval task.

A retrieval task to which the read data belongs is determined, and the read data can be simultaneously used in a plurality of concurrent retrieval tasks, to improve data reading efficiency.

In one embodiment, the one or more processors are further configured to determine a second retrieval end address of the second retrieval task in the target data area based on the address of the data to be read.

In one embodiment, that the one or more processors determine a second retrieval start address of a second retrieval task in the target data area based on an address of data to be read includes: setting the address of the data to be read as the second retrieval start address.

In one embodiment, that the one or more processors are further configured to determine a second retrieval end address of the second retrieval task in the target data area based on the address of the data to be read includes: setting a previous data address of the address of the data to be read as the second retrieval end address.

A start data reading location and an end data reading location of the retrieval task can be more accurately determined by setting a retrieval start address and a retrieval end address. This improves data reading efficiency and retrieval task execution efficiency, and avoids repeated data reading or omission of unread data.

According to a sixth aspect, this application provides a computer-readable storage medium, where the computer-readable storage medium stores program code, and the program code includes an instruction used to perform some or all operations of the method in either the first aspect or the second aspect.

According to a seventh aspect, this application provides a computer program product, where when the computer program product runs on a computer, the computer is enabled to perform some or all operations of the method in either the first aspect or the second aspect.

It should be understood that technical solutions in the second to the seventh aspects of this application are consistent with that in the first aspect. Beneficial effects achieved by the various aspects and corresponding implementations are similar, and details are not described again.

It can be learned that, according to the technical solution in the embodiments of this application, data reading of a plurality of data processing tasks can be simultaneously processed, and data reading of a next task does not need to be performed until data reading of a currently executed task is completed. Therefore, a plurality of concurrent tasks can simultaneously read data to improve data read efficiency, reduce service waiting time, and reduce a service processing delay. A start location and an end location of data reading are identified by using a data block address or a data unit address, so that whether data reading of each task is completed can be accurately determined when data reading of a plurality of tasks is concurrently performed and avoiding repeated data reading or omission of unread data.

BRIEF DESCRIPTION OF DRAWINGS

To describe the technical solutions in the embodiments of this application or in the background more clearly, the following briefly describes the accompanying drawings for the embodiments of this application or the background.

FIG. 6 shows an example of an address record table according to an embodiment of this application;

DESCRIPTION OF EMBODIMENTS

Figure 1A:
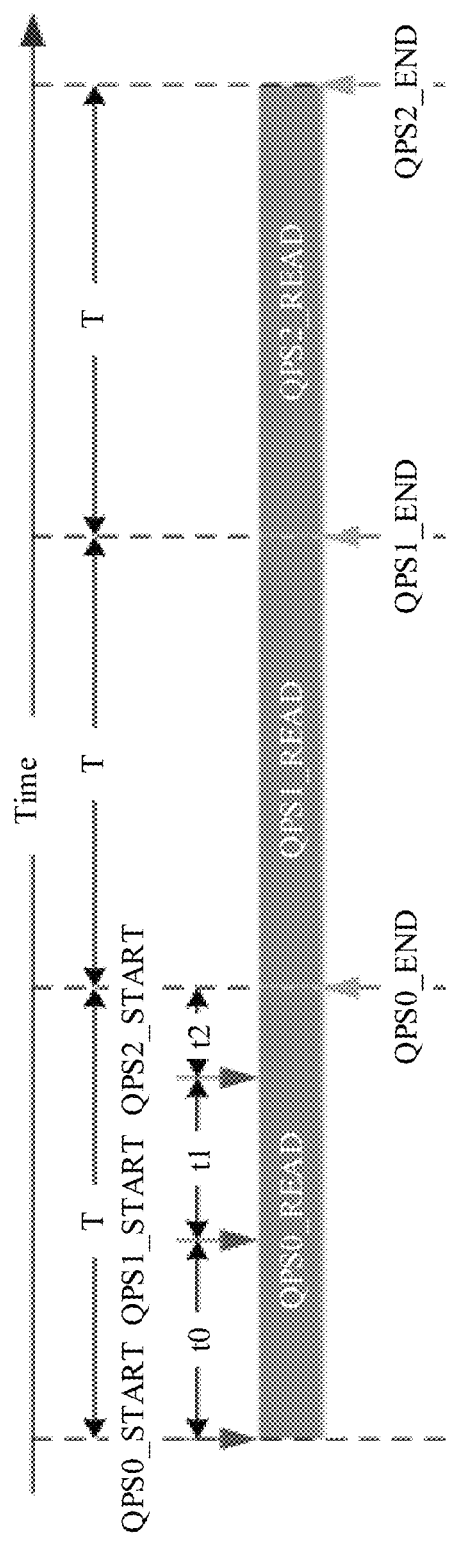
FIG. 1a is a block diagram of processing of a concurrent search service in the prior art.

The following describes specific implementations of this application by using examples with reference to the accompanying drawings in the embodiments of this application. However, implementations of this application may further include combining these embodiments without departing from the spirit or scope of this application, for example, using another embodiment and making structural changes. Therefore, detailed descriptions of the following embodiments should not be construed as limitative. Some terms used in implementations of this application are merely used to explain specific embodiments of this application, but are not intended to limit this application.

One or more structures of functions, modules, features, units and the like mentioned in specific embodiments of this application may be understood as being implemented in any manner by any physical or tangible component (for example, software running on a computer device, hardware (for example, a logical function implemented by a processor or a chip), and/or any other combination thereof). In some embodiments, the division of various devices into different modules or units shown in the accompanying drawings may reflect the use of corresponding different physical and tangible components in implementation. In one embodiment, a single module in the accompanying drawings of the embodiments of this application may be implemented by a plurality of physical components. Similarly, any two or more modules depicted in the drawings may also reflect different functions performed by a single physical component.

In the method flowchart of this embodiment of this application, some operations are performed by different operations in a specific sequence. The flowchart is illustrative and not restrictive. Certain operations described herein may be grouped together and performed in a single operation, certain operations may be divided into multiple sub-operations, and certain operations may be performed in a sequence different from that shown herein. The operations shown in the flowchart may be implemented in any manner by any circuit structure and/or tangible mechanism (for example, software running on a computer device, hardware (for example, a logical function implemented by a processor or a chip), and/or any combination thereof).

In the following description, one or more features may be marked as "optional". A declaration should not be interpreted as an exhaustive indication of features that are considered optional. That is, although not explicitly identified in the text, another features may be considered optional. In addition, any description of a single entity is not intended to exclude the use of multiple entities. Similarly, the description of multiple entities is not intended to exclude the use of a single entity. Finally, the term "exemplary" refers to an implementation of many potential implementations.

The embodiments of this application are mainly applicable to processing a plurality of concurrent services, and are specifically applicable to an application scenario in which the plurality of concurrent services need to read data in a specified storage area, for example, a retrieval service based on people's characteristics provided by a video surveillance system in a safe city scenario.

Currently, for this type of service, a software retrieval solution of a general retrieval platform such as a central processing unit (CPU) or a graphics processing unit (GPU) in the industry usually performs serial processing in different concurrent Queries per second (QPSs) retrieval tasks, specifically, performs data reading and retrieval from a memory in a serial manner (the retrieval herein refers to outputting a retrieval result after analyzing the read data). FIG. 1a is a block diagram of processing concurrent retrieval services by a general retrieval platform such as a CPU and a GPU in the prior art. T is a time required for executing a single QPS retrieval task without waiting. As shown in FIG. 1a, a retrieval request of QPS0 is received at an initial moment QPS0_START, data starts to be read from a memory, and the read data is retrieved according to the retrieval request of QPS0. When data reading of QPS0 is not completed, retrieval requests of QPS1 and QPS2 are received at moments QPS1_START and QPS2_START, respectively. In this case, retrieval tasks of QPS1 and QPS2 need to wait for a moment QPS0_END at which the data reading of QPS0 is completed and start to read data for the retrieval tasks of QPS1 and QPS2 from the memory in sequence in a serial manner, in other words, start to read data for the retrieval task of QPS1 from the memory at QPS0_END, and then start to read data for the retrieval task of QPS2 from the memory at a moment QPS1_END at which the data reading of QPS1 is completed. Therefore, a total time of performing the three retrieval tasks is 3×T. Duration of the retrieval task of QPS1 is T+t1+t2 (time from the moment at which the retrieval request is sent to the moment at which a retrieval result is obtained). Duration of the retrieval task of QPS2 is 2T+t2. The rest may be deduced by analogy. Therefore, a delay increases for a subsequent concurrent QPS retrieval task.

Figure 1B:
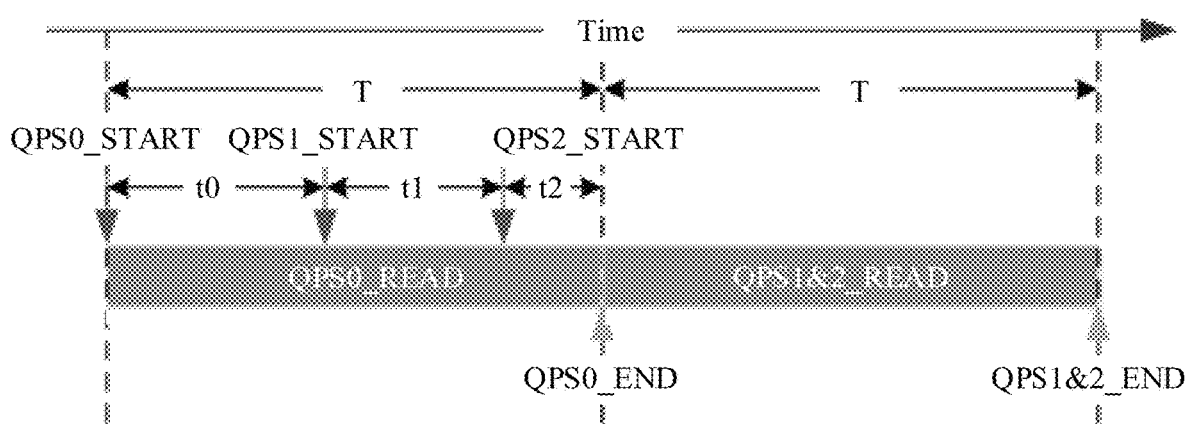
FIG. 1b is a block diagram of processing of another concurrent search service in the prior art.

In addition to the foregoing manner, in the prior art, when a dedicated computing platform such as an FPGA or an ASIC is applied to a similar scenario, there is a technical solution in which concurrent QPS retrieval tasks wait simultaneously read data from a memory at a specified time, and after data reading, retrieval is performed for different retrieval tasks (the read data is separately analyzed and determined). A specific implementation is shown in FIG. 1B. Same as FIG. 1a, T is a time required for performing a single QPS retrieval task without waiting. QPS0_START is the initial moment at which the retrieval request of QPS0 is received. Before data reading of QPS0 is completed, the retrieval requests of QPS1 and QPS2 are received at the moments of QPS1_START and QPS2_START, respectively. In this case, the retrieval tasks of QPS1 and QPS2 also need to wait for the moment QPS0_END at which the data reading of QPS0 is completed and start to read data from the memory. The read data is used for both the retrieval tasks of QPS1 and QPS2. Therefore, the total time of performing the three retrieval tasks is 2×T. The duration of the retrieval task of QPS1 is T+t1+t2 (time from the moment at which the retrieval request is sent to the moment at which a retrieval result is obtained). The duration of the retrieval task of QPS2 is T+t2.

Figure 2:
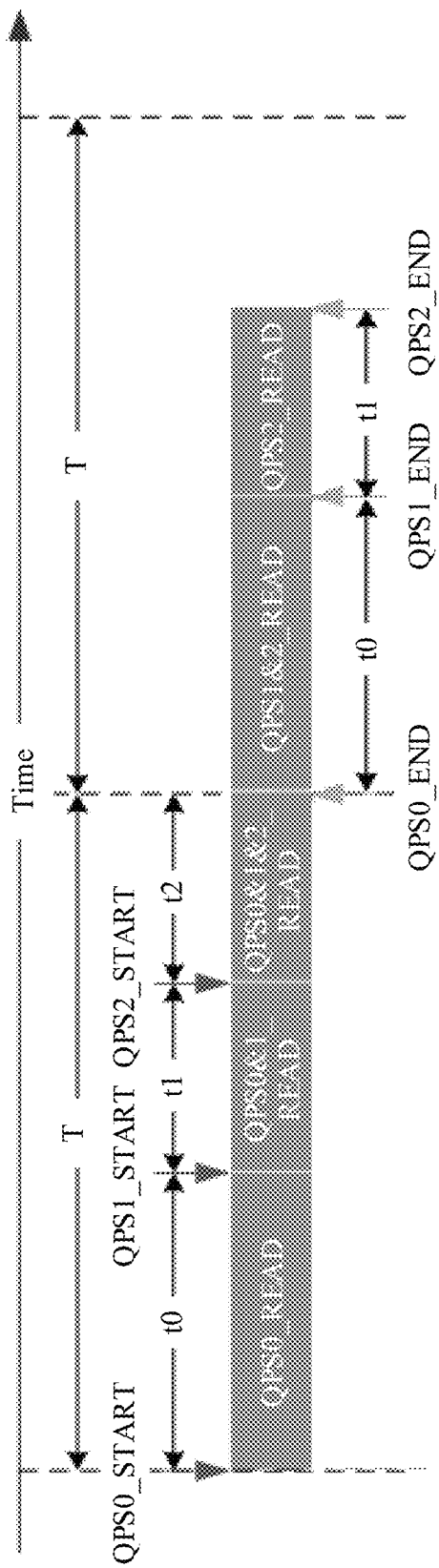
FIG. 2 is a block diagram of processing of a concurrent search service according to an embodiment of this application.

FIG. 2 is a block diagram of processing a concurrent search service according to an embodiment of this application. T is a time required for performing a single QPS retrieval task without waiting. QPS0_START is the initial moment at which the retrieval request of QPS0 is received. Before data reading of QPS0 is completed, if the retrieval requests of QPS1 and QPS2 are received at the moments QPS1_START and QPS2_START, respectively, compared with the prior art, in this embodiment of this application, the retrieval tasks of QPS1 and QPS2 may directly start to read data at QPS1_START and the QPS2_START respectively without waiting for completing data reading of QPS0. After the data reading, the read data is separately used for the retrieval tasks that are being performed based on a status of concurrent QPS services. For example, the data that is read from QPS1_START to QPS2_START is used for the retrieval tasks of QPS0 and QPS1. The data that is read from QPS2_START to QPS0_END is used for the retrieval tasks of QPS0, QPS1, and QPS2. The data that is read from QPS0_END to QPS1_END is used for the retrieval tasks of QPS1 and QPS2. The data that is read from QPS1_END to QPS2_END is used for the retrieval task of QPS2. Therefore, in this embodiment of this application, the concurrent retrieval tasks can directly read data without waiting. In the example, the total time of performing the three retrieval tasks is T+t1+t2, and the duration of the retrieval tasks of QPS1 to QPS2 each is T. The data reading of QPS0 ends at QPS0_END. The data reading of QPS1 ends at QPS1_END. The data reading of QPS2 ends at QS2_END.

Herein, a case in which data reading and data retrieval are simultaneously performed is described. Similarly, in a solution in which data is first read and then used for retrieval, another retrieval task request can also be received when data reading of a current retrieval task is not completed. This saves a total data reading time of a plurality of retrieval tasks, and improves retrieval task processing efficiency. FIG. 2 shows only an implementation of this embodiment of this application. To be specific, after a new QPS request (for example, QPS1) is received during performing the task of QPS0, data reading and retrieval of the task of QPS1 are immediately performed. In an actual process, the task of QPS1 may not necessarily be started at the moment at which the request of QPS1 is received, but may be started at any moment between a moment before the task of QPS0 ends and a moment at which the new QPS request is received. A specific implementation of this application is described in detail in the following embodiments.

Figure 3A:
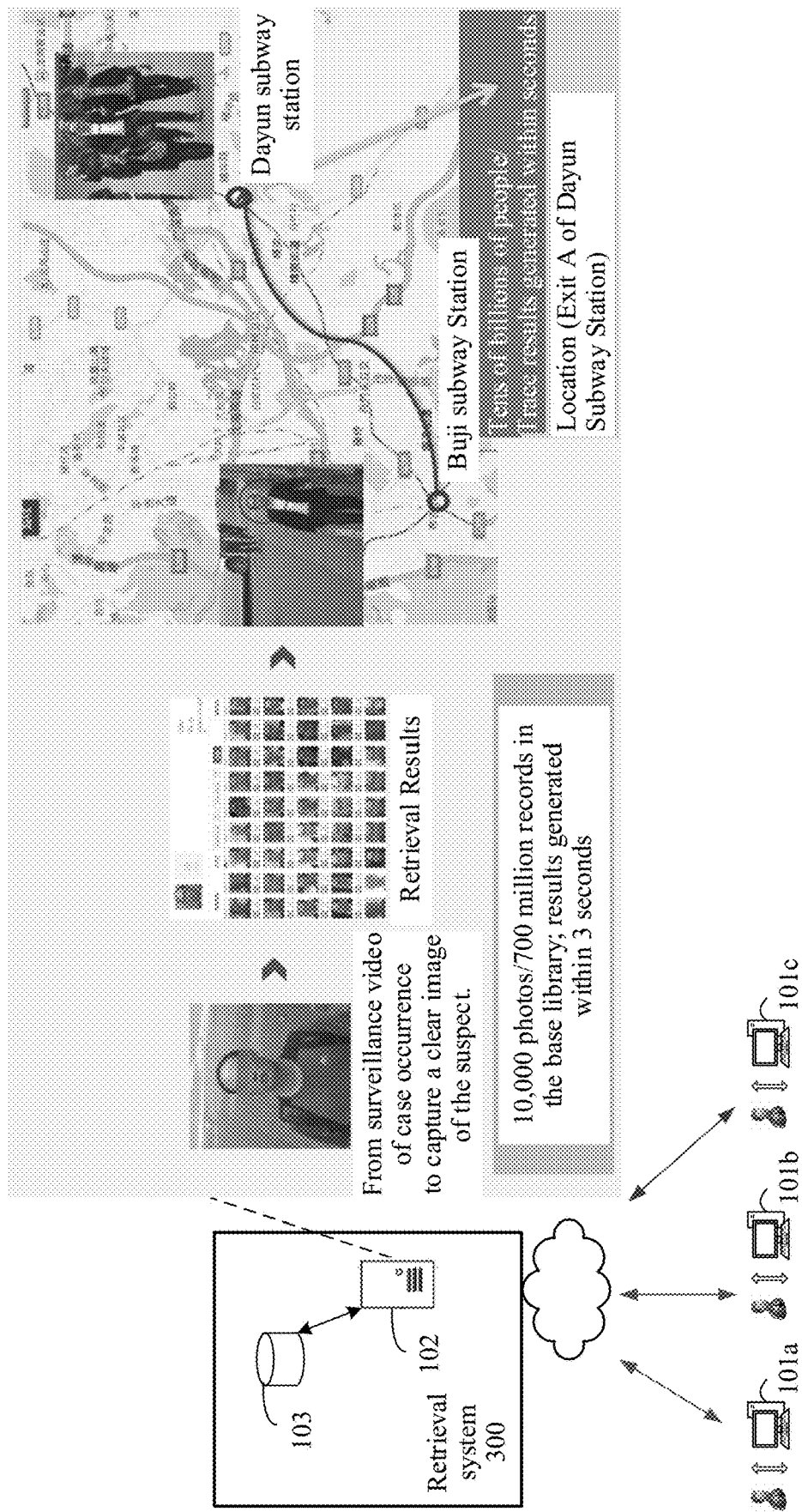
FIG. 3a is a block diagram of an application scenario according to an embodiment of this application.

FIG. 3a is a block diagram of an application scenario according to an embodiment of this application. The application scenario includes a plurality of terminal devices (101a, 101b, and 101c), a data retrieval apparatus 102, and a data storage apparatus 103. Only three terminals are shown as an example herein. In an actual application scenario, a quantity of terminals may not be limited based on an actual situation. The terminal device (101a, 101b, or 101c) may be a computer, a notebook computer, a computer workstation, a smart phone or a mobile phone of another type, a tablet computer, a wearable device, and the like. The data retrieval apparatus 102 may be a device or a server that has a data processing function, such as a cloud server, a network server, an application server, or a management server. The data retrieval apparatus 102 may include one or more servers that are configured to jointly implement a data service, for example, a search service. When there are a plurality of data retrieval apparatuses 102, they can be placed in a centralized manner or physically in a distributed manner, and are connected through long-distance communication connection. Because a specific embodiment of this application is about processing of a data reading service, the data storage apparatus 103 is further included. Similarly, the data storage apparatus 103 may be in a plurality of forms, for example, an independent storage device or a memory integrated into another device or system. There may be one or more data storage apparatuses 103. When there are a plurality of data storage apparatuses 103, the data storage apparatuses 103 may be placed in a centralized manner or physically in a distributed manner, and are connected through long-distance communication connection. In the figure, that the data storage apparatus 103 is independently disposed outside the data processing system 102 is merely an example. In one embodiment, the data storage apparatus 103 may also be disposed in the data retrieval apparatus 102, and the data retrieval apparatus 102 may also be connected to some other network devices, such as a router and a load balancing device. This is not shown in the accompanying drawings. The terminal device (101*a*, 101*b*, or 101*c*) and the data retrieval apparatus 102 may be communicatively connected in a plurality of manners, including but not limited to any wired or wireless connection such as a wide area network, a local area network, or a point-to-point connection.

Herein, video surveillance of a safe city solution is also used as an example application scenario. A retrieval system 300 includes the data retrieval apparatus 102 and the data storage apparatus 103. After the data retrieval apparatus 102 of the retrieval system 300 receives a retrieval task 1 of QPS, for example, a picture, input by any terminal device (101*a*, 101*b*, or 101*c*), the data retrieval apparatus 102 starts to traverse and retrieve all pictures in the data storage apparatus 103 (which is specifically a system picture library 103 herein), and returns a most relevant picture. For example, a search request is searching for a picture of a suspect. A target retrieval result is pictures of all persons having a suspect feature in the picture library, and there may be one or more most relevant pictures. Herein, the system picture library in FIG. 3*a* is one or more independent storage apparatuses. In one embodiment, the picture library may also be integrated into the data retrieval apparatus 102.

In this case, if another retrieval task of QPS (for example, a task 2) is received, the data retrieval apparatus 102 determines whether an old retrieval task of QPS is still reading a picture in the system picture library 103. If there is no old retrieval task, the system traverses the picture library 103 to perform retrieval for the task 2 from a start location. If an old retrieval task (the task 1) of QPS is reading inventory data, the system simultaneously continues to read data from a storage unit for different retrieval tasks of QPS starting from a data reading start location for the task 2 of new retrieval task of QPS from a data to be read for the current task 1, separately performs retrieval on the read data for the different retrieval tasks. In addition, the system uses a recorded data reading end location of each retrieval task of QPS to determine a data reading progress of each retrieval task, for example, whether data reading is completed. After completing retrieval for the different retrieval tasks of QPS, retrieval modules separately report retrieval results. There are a plurality of manners of reporting a retrieval result. The retrieval result may be reported while being retrieved, or this is not specifically limited herein.

Figure 3B:
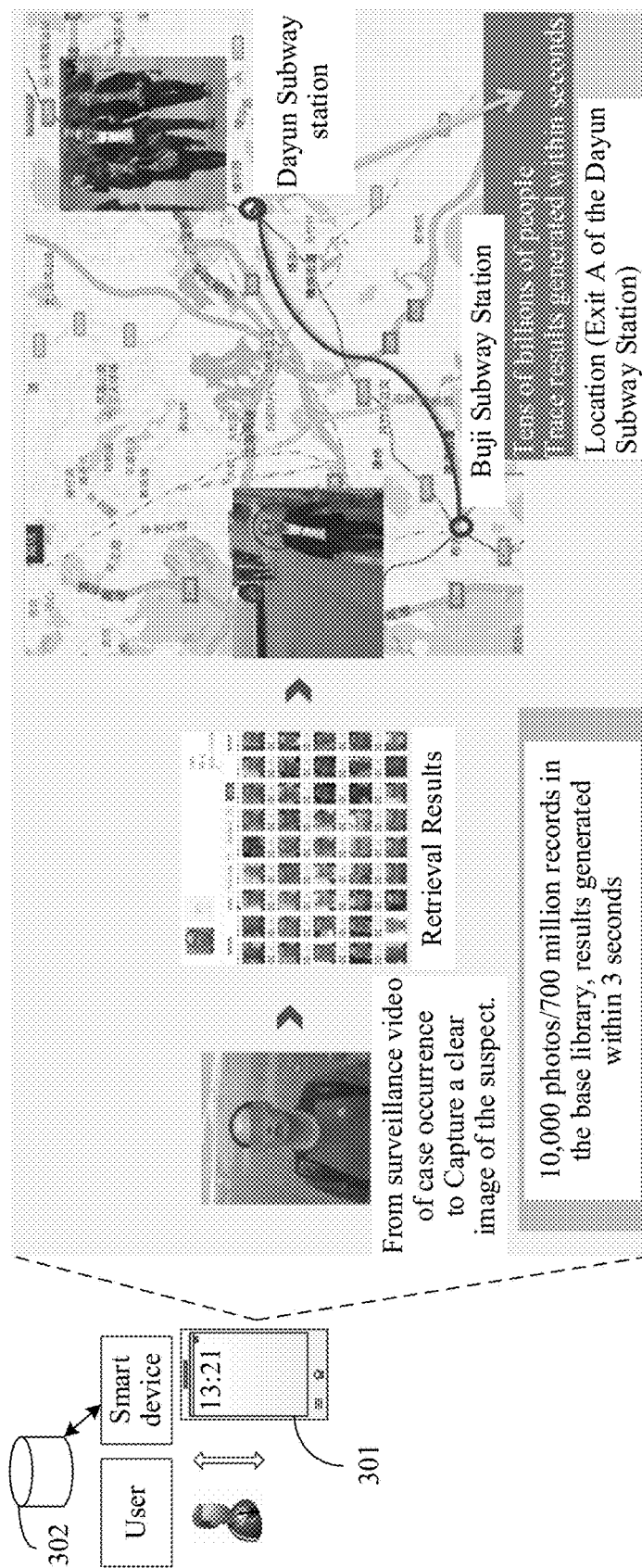
FIG. 3b is a block diagram of another application scenario according to an embodiment of this application.

FIG. 3*b* is a block diagram of a scenario implemented by a network-side data retrieval apparatus 102 according to an embodiment of this application. In one embodiment, in this application, as shown in FIG. 3*b*, concurrent retrieval for a plurality of retrieval tasks may be directly performed on a terminal 301. In this case, a capability of performing a retrieval task by the terminal 301 is the same as that of the data processing apparatus in FIG. 3*a*. Details are not described herein again. Data that is read when the terminal 301 performs the retrieval task may be from a data storage apparatus 302 or a storage unit of the terminal 301.

In FIG. 3*a* and FIG. 3*b*, a new retrieval task is incorporated into a process of performing an old retrieval task while data reading is performed at the same time. This can reduce waiting time between concurrent retrieval tasks, and improve data reading efficiency.

Figure 4:
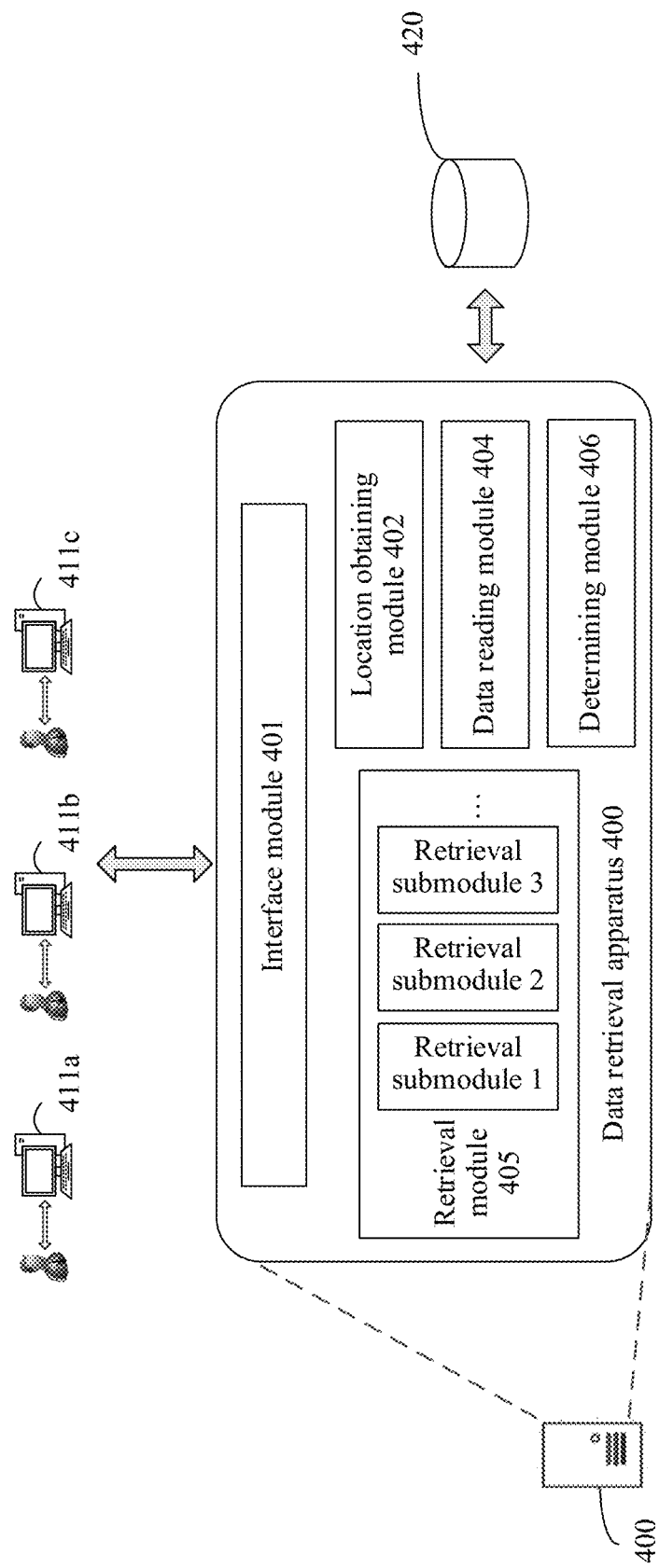
FIG. 4 is a block diagram of a retrieval apparatus according to an embodiment of this application.

FIG. 4 is one of implementations of a data retrieval apparatus 400 according to an embodiment of this application. The data retrieval apparatus 400 may be the data retrieval apparatus 102 in FIG. 3*a*, the terminal 301 in FIG. 3*b*, or another entity apparatus. For example, the data retrieval apparatus 400 in this embodiment of this application may include an interface module 401, a location setting module 403, and a data reading module 404.

The interface module 401 is configured to receive a first retrieval task request, and receive a second retrieval task request in a process of reading data for a first retrieval task.

Specifically, the interface module 401 is mainly configured to communicate with an external device, receive retrieval task request information sent by the external device (for example, any one or more of the terminal device 411*a*, 411*b*, or 411*c*), and feedback corresponding retrieval result information based on a processing result of the retrieval task request information. For example, the interface module 401 may receive one or more pieces of retrieval task request information, which may be one or more new task requests that are received when an ongoing task is not completed, sent by the terminal device (any one or more of 411*a*, 411*b*, or 411*c*), and return a retrieval result based on the processing result. For example, when the terminal device 411*a* needs to perform retrieval, the terminal device 411*a* may send the retrieval task request information to the interface module 401. When a retrieval task of the terminal device 411*a* is not completed and the terminal device 411*a* receives a new retrieval task request initiated by the terminal device 411*a* or another terminal device (411*b* or 411*c*), the data retrieval apparatus 400 returns, after the retrieval task is completed, a retrieval result by using the interface module 401 to the terminal that sends the retrieval task request information.

All retrieval tasks corresponding to the retrieval task requests received by the interface module 401 read data and perform retrieval in a same target data area. After traversing and completing retrieval in the data area, the interface module 401 may stop the retrieval task and return the retrieval result. This embodiment of this application focuses on a data reading process. If retrieval is performed after data reading, whether retrieval is performed while data is reading or retrieval is performed after data reading is completed is not specially limited. When the data retrieval apparatus 400 is a terminal device, the retrieval task request received by the interface module 401 may also be a retrieval task request input by a terminal user.

The location setting module 403 is configured to, after the interface module 401 receives the second retrieval task request, determine a second retrieval start address of a second retrieval task in the target data area based on an address of data to be read for the first retrieval task.

The Details are as Follows:

The location setting module 403 sets the retrieval start address of the received retrieval task request. When receiving a new retrieval task request and no other retrieval tasks are currently being performed, the location setting module 403 sets a retrieval start address of a new retrieval task as a start data location of the target data area. When the interface module 401 receives the new retrieval task (the second retrieval task) request in a process of performing the retrieval task (the first retrieval task), the interface module 401 obtains the address of the data to be read for the currently ongoing retrieval task (the first retrieval task), sends address information to the location setting module 403. The address information may be directly sent to or may be indirectly obtained by the location device module 403. After learning the address of the data to be read for the currently ongoing retrieval task, the location setting module 403 determines, based on the address of the data to be read for the current retrieval task, a retrieval start address of retrieval data to be read for the new retrieval task.

The target data area may include a plurality of data units, or may include a plurality of data blocks. Each data block may include a plurality of data units. The address may be a data unit address or a data block address of the target data area. The data block address may be identified by an address of a data unit in a data block. There may be one or more ongoing retrieval tasks. Each retrieval task has its own retrieval start address and retrieval end address.

The retrieval start address is used to indicate an address of a start location of the data to be read for the new retrieval task. The retrieval start address may be set to any address from an address of data that is currently to be read to the retrieval end address of the current retrieval task (including the address of the data that is currently to be read and the retrieval end address of the current retrieval task). If there are a plurality of ongoing retrieval tasks, the retrieval end address may be a retrieval end address of any ongoing retrieval task. For example, by default the retrieval end address is set to a retrieval end address of an earliest completed retrieval task, or may be an end address of a recently received retrieval task before a current newly received retrieval task. For example, the address of the data that is currently to be read may be set as the retrieval start address of the new retrieval task, or an address of a next data block or a next data unit of the address of the data that is currently to be read may be set as the retrieval start address of the new retrieval task.

In one embodiment, when setting the retrieval start address of the new retrieval task, the address setting module 403 may also set a retrieval end address of the new retrieval task at the same time. Because each retrieval task needs to traverse the target data area, after a retrieval start address of a retrieval task is selected, a retrieval end address is also determined. For example, when the address of the data that is currently to be read is set as the retrieval start address of the new retrieval task, to ensure that all data in the target data area is traversed, a previous address of the address of the data that is currently to be read may be set as the retrieval end address of the new retrieval task.

A method for setting the retrieval start address and the retrieval end address may be recording the retrieval start address in an address record table. As shown in FIG. 6, START0, END0, and the like indicate a retrieval start address and a retrieval end address of a corresponding task. In addition to the foregoing method, another field may be added to the table to identify the address information.

In one embodiment, the location setting module 403 is further configured to delete the address of the corresponding task from the address record table after the retrieval task is completed.

The data reading module 404 is configured to read data for the first retrieval task starting from the first retrieval start address, and read data for the second retrieval task starting from the second retrieval start address.

Specifically, after the data retrieval apparatus 400 receives the retrieval task request, the data reading module 404 sequentially reads the target data area based on the task request. When the data retrieval apparatus 400 receives the task request, if no other retrieval tasks are currently being performed, the data reading module 404 sequentially reads data from first data in the target data area. If another retrieval task is currently being performed, there may be one or more retrieval tasks. In this case, the data reading module 404 does not stop reading data or read data again because of the newly added retrieval task, but continues to read data based on current reading progress. If the location setting module 403 learns that a data unit to be read for another retrieval task at a current moment is DATAn, the data reading module 404 continues to read data DATAn, DATAn+1, . . . According to a predetermined data reading sequence. The location setting module 403 sets a retrieval start location for each newly added retrieval task. When reading the retrieval start location for the newly added retrieval task, it indicates that the newly added retrieval task starts to read data. In other words, the data that is currently to be read is used for all ongoing retrieval tasks, including the newly added retrieval task.

In one embodiment, a retrieval end address is also set for each retrieval task. Each time the data reading module 404 reads a retrieval end address of a retrieval task, it indicates that data reading of the task is completed, and next data to be read is no longer used for retrieval of the task.

In addition to the foregoing modules, in one embodiment, the data retrieval apparatus 400 may further include a determining module 406 and a data retrieval module 405.

The determining module 406 is configured to determine the retrieval task corresponding to the data read by the data reading module 404.

Specifically, the determining module 406 determines the retrieval task corresponding to the read data based on the address of the data read by the data reading module 404 and the retrieval end address of each ongoing retrieval task. If there is the newly received retrieval task, the determining module 406 further needs to determine a retrieval task corresponding to to-be-read data based on a retrieval start address of the newly received retrieval task.

If there is the newly initiated retrieval task request, the determining module 406 obtains, from the location setting module 403, a location of the data that is currently to be read for the retrieval task, and obtains, from the address record table of the retrieval task, the retrieval start address to the data to be read for the newly received retrieval task (the second retrieval task). In this case, if an address of the data unit DATAn is the retrieval start address, when the determining module 406 determines, by comparing an address of data to be read with the retrieval start address in the address record table, that the address of the data to be read is the retrieval start location of the newly received retrieval task. The to-be-read data determined by the determining module 406 is used for the newly received retrieval task to perform retrieval. If the determining module 406 still determines that the address of the data to be read is a retrieval end address of an ongoing retrieval task, the determining module 406 determines that data reading for the retrieval task is completed and next data to be read does not need to be used for the retrieval task to perform retrieval. For data to be subsequently read, if no new retrieval task request is initiated, the determining module 406 compares and determines whether a location of the data to be subsequently read is a retrieval end location of the ongoing retrieval task. If the location is not the retrieval end location of the ongoing retrieval task, the read data needs to be continuously used for all the ongoing retrieval tasks to perform retrieval. Until the determining module 406 determines that the address of the data to be subsequently read is the retrieval end address of the ongoing retrieval task, the determining module 406 determines that data reading for the retrieval task is completed and the next data to be read does not need to be used for this task to perform retrieval.

In one embodiment, in addition to the foregoing task determining method, the determining module 406 may further determine the retrieval task corresponding to the to-be-read data based on the address of the data read by the data reading module 404, the retrieval start address and the retrieval end address of the ongoing retrieval task, and the retrieval start address and the retrieval end address of the newly received retrieval task. Specifically, after receiving the address of the data read by the data reading module 404, the determining module 406 compares the address of the data with the retrieval start address and the retrieval end address in the address record table of the retrieval task. In this case, if the address of the read data is a retrieval start address of a task, the determining module 406 determines that the read data needs to be used for the retrieval task to perform retrieval. If the address of the read data is a retrieval end address of the task, the determining module 406 determines that data reading for the retrieval task is completed and next data to be read does not need to be used for the retrieval task to perform retrieval.

The retrieving module 405 is configured to perform retrieval based on the data read by the data reading module 404.

Specifically, the retrieving module 405 separately performs retrieval based on the data read by the data reading module 404 and the retrieval task that corresponds to the read data and that is determined by the determining module 406, and returns a retrieval result.

The retrieval module 405 may include a fixed quantity of retrieval submodules. Each retrieval task corresponds to a different retrieval submodule. The retrieval module 405 receives the read data sent by the data reading module 404, and distributes, based on the retrieval task that needs to perform retrieval for the read data and that is determined by the determining module 406, the read data to a retrieval submodule corresponding to the retrieval task.

In on embodiment, the address record table may further include an identifier of the retrieval submodule corresponding to the retrieval task. After determining, the determining module 406 sends an identifier of a retrieval submodule of a corresponding task to the retrieval module 405, and the retrieval module 405 sends data to a corresponding retrieval submodule according to the identifier of the retrieval submodule to perform retrieval.

When the retrieval submodule is implemented by hardware, a quantity of retrieval submodules may be fixed. When a quantity of concurrent retrieval tasks exceeds the quantity of the retrieval submodules, a subsequent retrieval task needs to wait. When the quantity of concurrent retrieval tasks does not exceed the quantity of retrieval submodules, a retrieval submodule is specified for a new retrieval task.

In one embodiment, the quantity of retrieval submodules may not be fixed. A corresponding retrieval submodule may be generated based on the quantity of retrieval tasks.

In the foregoing embodiment, a data reading location of the ongoing retrieval task is obtained and used as a reference to locate a retrieval start location of the newly initiated retrieval task, and data reading of the retrieval task initiated later does not need to be performed until data reading of a retrieval task initiated first is completed. Therefore, a plurality of concurrent retrieval tasks can simultaneously read data to improve data reading efficiency, reduce service waiting time, and reduce a service processing delay. In addition, a retrieval task to which the read data belongs is determined, and the read data can be simultaneously used for a plurality of concurrent retrieval tasks. A data reading progress of retrieval tasks can be precisely controlled at the same time, and data reading accuracy of the retrieval tasks can be improved.

Figure 5:
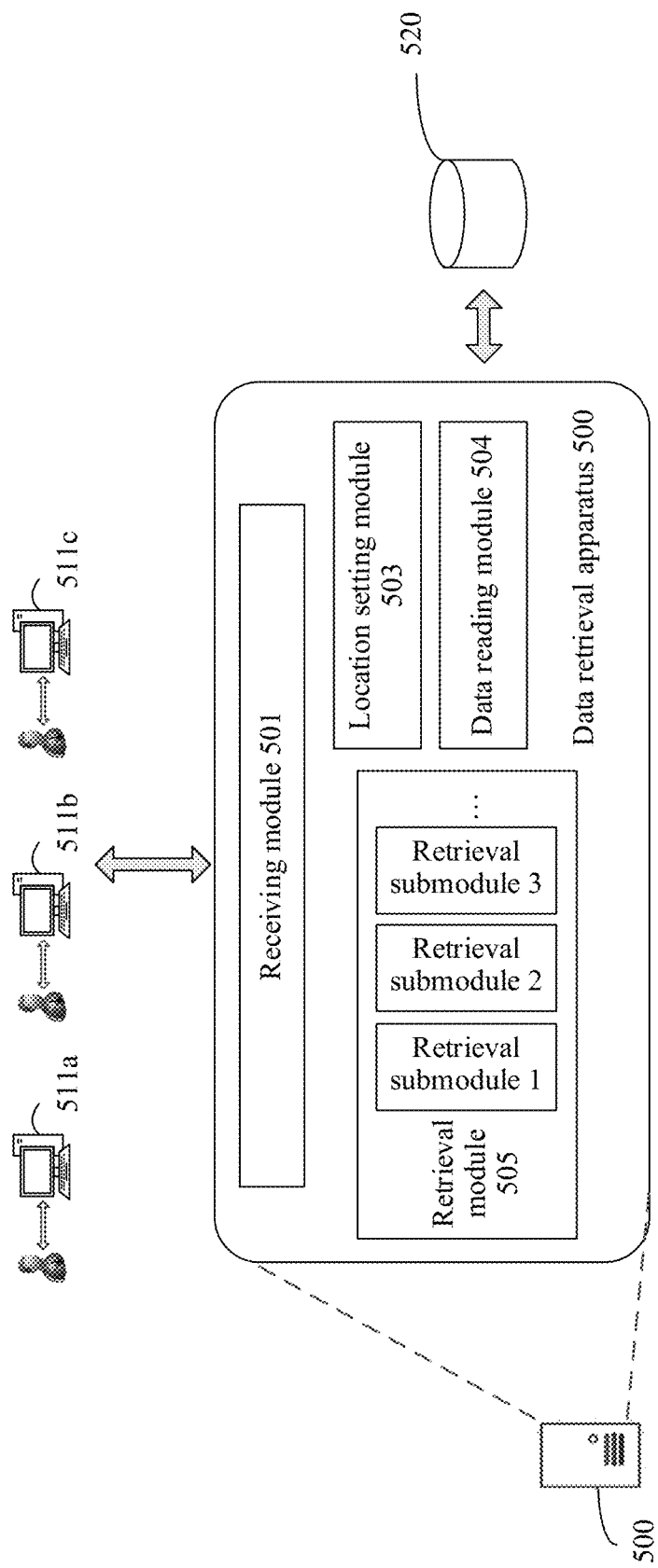
FIG. 5 is a block diagram of another retrieval apparatus according to an embodiment of this application.

A structure of the data retrieval apparatus may also be shown in FIG. 5. Functions of an interface module 501 and a location setting module 503 are the same as those of the corresponding modules shown in FIG. 4, and no determining module is disposed.

A data reading module 504 and a retrieval module 505 may be:

The data reading module 504 is configured to sequentially read data in a target data area. When a task request is received and no other retrieval tasks are currently being performed, the data reading module 504 sequentially reads data from first data in the target data area. When a new retrieval task is received in a process of performing a retrieval task, the data reading module continues to sequentially read data based on a location of the data that is currently to be read for the retrieval task in the target data area and determines a retrieval task corresponding to the data that continues to be read based on the location of the data that continues to be read and a start location and an end location of data to be read for a target retrieval task.

The data reading module 504 may further include a determining function. To be specific, when reading data, the data reading module 50 simultaneously determines the retrieval task corresponding to the currently to-be read data based on an address record table.

The retrieving module 505 is configured to separately perform retrieval for the retrieval task based on the data read by the data reading module 504. The retrieval module 505 distributes, based on the retrieval task that needs to perform retrieval, the read data to a retrieval submodule corresponding to the retrieval task. After completing the retrieval task, the retrieval module 505 returns a retrieval result corresponding to the task.

The data reading module 504 and the retrieval module 505 may further be:

The data reading module 504 is configured to continue to read data in the target data area based on a location of data that is currently to be read for another retrieval task in the target data area, and send the read data and an address of the data to the retrieval module 505.

The retrieving module 505 determines, after receiving the data read by the data reading module 504 and the address of the data, based on the address record table, the retrieval task corresponding to the data that is currently to be read. The retrieving module 505 is configured to separately perform retrieval for the retrieval task based on the data read by the data reading module 504. The retrieval module 505 distributes, based on the retrieval task that needs to perform retrieval, the read data to a retrieval submodule corresponding to the retrieval task. After completing the retrieval task, the retrieval module 505 returns a retrieval result corresponding to the task.

Beneficial effects achieved by the embodiment corresponding to FIG. 5 are similar to beneficial effects achieved by the embodiment in the embodiment corresponding to FIG. 4.

The first retrieval task mentioned in this embodiment of this application is a general reference, and may be used to indicate any one or more retrieval tasks that are currently performed and that are not completed, may be used to indicate, according to a time relationship, a retrieval task before the second retrieval task request is sent and that is not completed, or may be used to indicate a latest retrieval task before the second retrieval task request is sent and that is not completed. The second retrieval task mentioned in this embodiment of this application is used to indicate a retrieval task corresponding to a new retrieval task request received in a process of performing the first retrieval task.

The target data area is shown as memories 420 and 520 in FIG. 4 and FIG. 5 as an example. The target data area may be set in a form of a memory independent of the data retrieval apparatus, may be disposed as a storage unit in the data retrieval apparatus, or may be disposed in another apparatus. The data location in this embodiment of this application may alternatively be an identifier that is used to identify the data location and that is different from a data unit address or a data block address.

A retrieval task is merely used as an example in FIG. 4 and FIG. 5 to describe a method of processing a retrieval task by a system, especially a video surveillance retrieval system applied to a safe city solution, to retrieve a face image. In addition, this embodiment of this application may be applicable to another type of retrieval task, for example, a retrieval task for a document or for an audio file. All or some functions of the modules in FIG. 4 and FIG. 5 may alternatively be implemented by another module.

Figure 7:
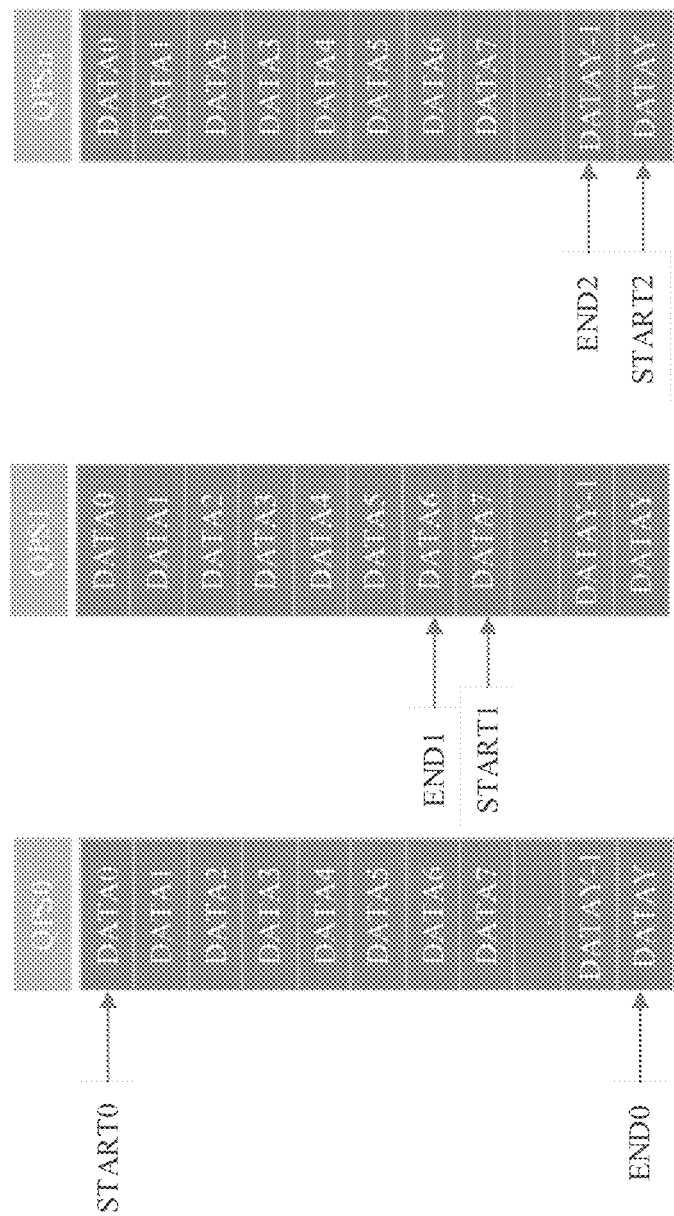
FIG. 7 is a block diagram of a data reading method for a retrieval task according to an embodiment of this application.

FIG. 7 is a detailed example of a data reading method according to an embodiment of this application. When a data retrieval apparatus in an idle mode receives a retrieval task request QPS0, because no other retrieval tasks are reading data, the data retrieval apparatus uses a start data address DATA0 in a target data area as a retrieval start address START0 of QPS0, and records it in a task 0 column in an address record table. In addition, the data retrieval apparatus records DATAY as a retrieval end address END0 of QPS0. The addresses DATA0 and DATAY may be a data unit address or a data block address in the target data area. The data reading module traverses data in the target data area from DATA0.

When the data retrieval apparatus performs QPS0 and receives a new retrieval task request QPS1 when reading DATA7, the data retrieval apparatus obtains an address of data to be read for QPS0. The data retrieval apparatus determines a retrieval start address of QPS1 based on the address of the data to be read for QPS0. Then, the data retrieval apparatus sets a data unit address or a data block address to be read for QPS0 as START1 of QPS1, and records it in the address record table, and sets a previous address of the data unit address or the data block address to be read for QPS0 to END1 and records it, to ensure that QPS1 can traverse the entire area. The data retrieval apparatus reads data at START1. In this case, because the ongoing retrieval tasks include QPS0 and QPS1, the read data is separately used to perform retrieval for the retrieval tasks of QPS0 and QPS1.

When the data retrieval apparatus concurrently performs QPS0 and QPS1 and is about to read data of DATAY, and the data retrieval apparatus receives a new retrieval task request QPS2. The data retrieval apparatus may repeat the foregoing address setting manner to set the addresses of the data to be read for QPS0 and QPS1 as START2 and record the addresses in the address record table. The data retrieval apparatus may set a data address or a data block address last read to END2, record it, and continue to read data from a location of START2. Because there are three ongoing QPS tasks, the read data is used for retrieval for QPS0, QPS1, and QPS2, respectively. Each time when reading data to END of a QPS task, the QPS task ends and data to be read for a next QPS task is not used for retrieval for the ended QPS task.

After the QPS task ends, an address record related to the task is deleted from the address record table, to indicate that the retrieval task ends, and a retrieval result corresponding to the retrieval task is returned. The data retrieval apparatus enters an idle mode until data for all the QPS tasks is read to respective END.

Figure 8:
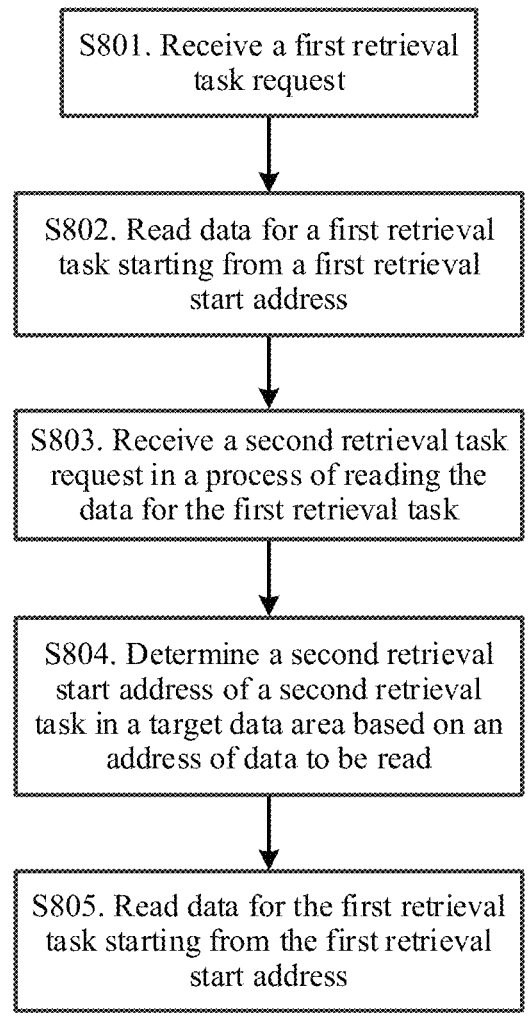
FIG. 8 is a flowchart of a data reading method for a retrieval task according to an embodiment of this application.

FIG. 8 is a flowchart of a data reading method for a retrieval task according to an embodiment of this application.

S801: Receive a first retrieval task request.

Specifically, the first retrieval task request is received, where the first retrieval task request corresponds to a first retrieval start address and a first retrieval end address in a target data area; and the target data area is a range of data that needs to be traversed when retrieval is performed for a first retrieval task. The first retrieval start address is an address at which a first retrieval task starts to read data and performs retrieval based on the read data. The first retrieval end address is an address of data that is last read for the first retrieval task. Reading from the first retrieval start address to the first retrieval end address can ensure that all data in the target data area is traversed for the first retrieval task.

S802: Read data for the first retrieval task starting from the first retrieval start address.

Specifically, starting from the first retrieval start address, the read data is used to perform retrieval for the first retrieval task. When reading to the first retrieval end address, data reading for the first retrieval task ends, and data to be subsequently read is not used for the first retrieval task to perform retrieval. In other words, data reading for the first retrieval task is sequentially from the first retrieval start address to the first retrieval end address in the target data area.

S803: Receive a second retrieval task request in a process of reading the data for the first retrieval task.

S804: Determine a second retrieval start address of a second retrieval task in the target data area based on an address of data to be read for the first retrieval task. The second retrieval start address may fall in a range from the address of the data to be read for the first retrieval task to the first retrieval end address.

Specifically, after the address of the data to be read for the currently ongoing retrieval task (the first retrieval task) is learned, according to, a retrieval start address of retrieval data to be read for a new retrieval task (the second retrieval task) is determined based on the address of the data to be read for the current retrieval task. The retrieval start address is used to indicate an address of a start location of the data to be read for the new retrieval task. The retrieval start address may be set as any location between the address of data that is currently to be read and the retrieval end address of the current retrieval task (including the address of the data that is currently to be read and the retrieval end address of the current retrieval task).

In one embodiment, the retrieval end address of the new retrieval task (the second retrieval task) may be further determined. Because each retrieval task needs to traverse the target data area, after a retrieval start address of a retrieval task is selected, a retrieval end address is also determined. For example, when the address of the data that is currently to be read is set as the retrieval start address of the new retrieval task, to ensure that all data in the target data area is traversed, a previous address of the address of the data that is currently to be read may be set as the retrieval end address of the new retrieval task. A method for setting the retrieval start address and the retrieval end address may be recording the retrieval start address in an address recording table.

S805: Read data for the second retrieval task starting from the second retrieval start address.

Specifically, the address of the data to be read for the first retrieval task is obtained. Because the data is sequentially read, if currently read data is DATAn, data DATAn, data DATAn+1, and the like continue to be read according to a predetermined data reading sequence. Each data that continues to be read is determined. When the read data is determined to be a second retrieval start location, it indicates that the second retrieval task starts to read the data. In other words, the data that currently starts to be read needs to be used for both the first retrieval task and the second retrieval task.

In one embodiment, a retrieval end address is also set for each retrieval task. Each time when reading to a retrieval end address of a retrieval task, it indicates that data reading of the task is completed, and next data to be read is not used for the task to perform retrieval.

Figure 9:
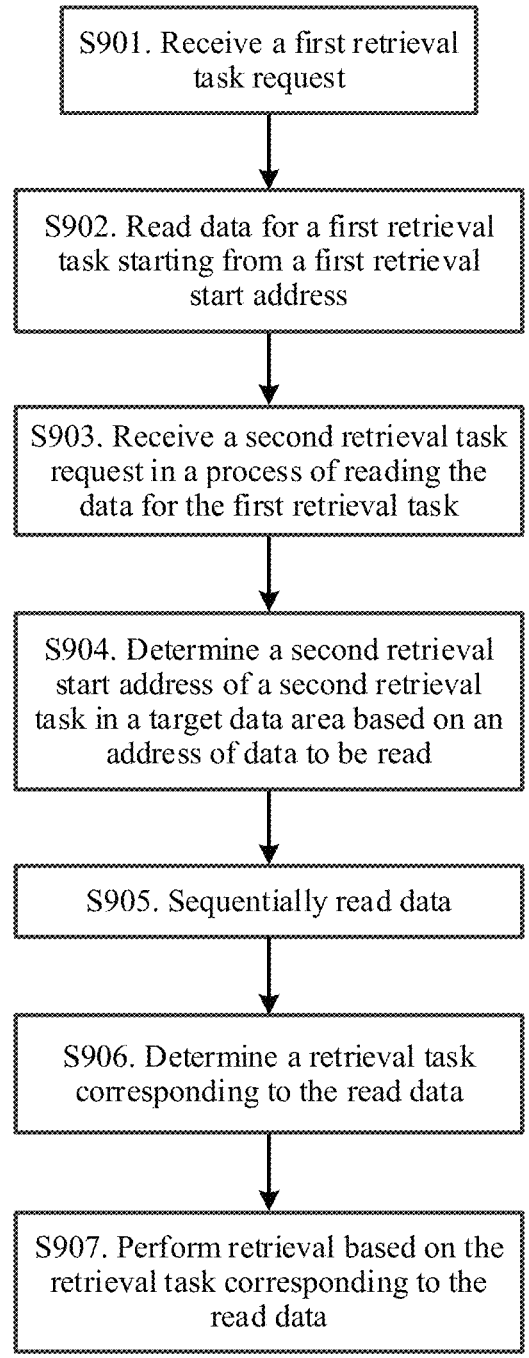
FIG. 9 is a flowchart of a retrieval method according to an embodiment of this application.

FIG. 9 is a retrieval method according to an embodiment of this application. Operations S901, S902, S903 and S904 are the same as the operations in the embodiment of the method for reading data for a retrieval task in FIG. 8. Details are not described herein again.

S905: Sequentially read data.

Specifically, the address of the data to be read for the first retrieval task is obtained. Because the data is sequentially read, if currently read data is DATAn, data DATAn, data DATAn+1, and the like continue to be read according to a predetermined data reading sequence.

S906: Determine a retrieval task corresponding to the read data.

The determining method has been described in detail in the descriptions of FIG. 4. The method may be used to determine a retrieval task corresponding to the read data based on the address of the address of the read data and the retrieval end address of each ongoing retrieval task. If there is a newly received retrieval task, a retrieval task corresponding to the read data needs to be determined based on a retrieval start address of the newly received retrieval task.

In one embodiment, the retrieval task corresponding to the read data may be determined based on the address of the read data, a retrieval start address and a retrieval end address of an ongoing retrieval task, and a retrieval start address and a retrieval end address of a newly received retrieval task. To be specific, after the address of the read data is received, the address is compared with the retrieval start address and the retrieval end address in an address record table of the retrieval task. In this case, if the address of the read data is a retrieval start address of a task, it is determined that the read data needs to be used for the retrieval task to perform retrieval. If the address of the read data is determined as a retrieval end address of the retrieval task, it is determined that data reading of the retrieval task is completed and next data to be read does not need to be used for the retrieval task to perform retrieval.

S907: Perform retrieval based on the retrieval task corresponding to the read data Specifically, retrieval is separately performed based on the read data and the retrieval task corresponding to the read data. A retrieval result is returned. When the read data corresponds to a plurality of retrieval tasks, the read data is separately retrieved for the plurality of retrieval tasks.

Figure 10:
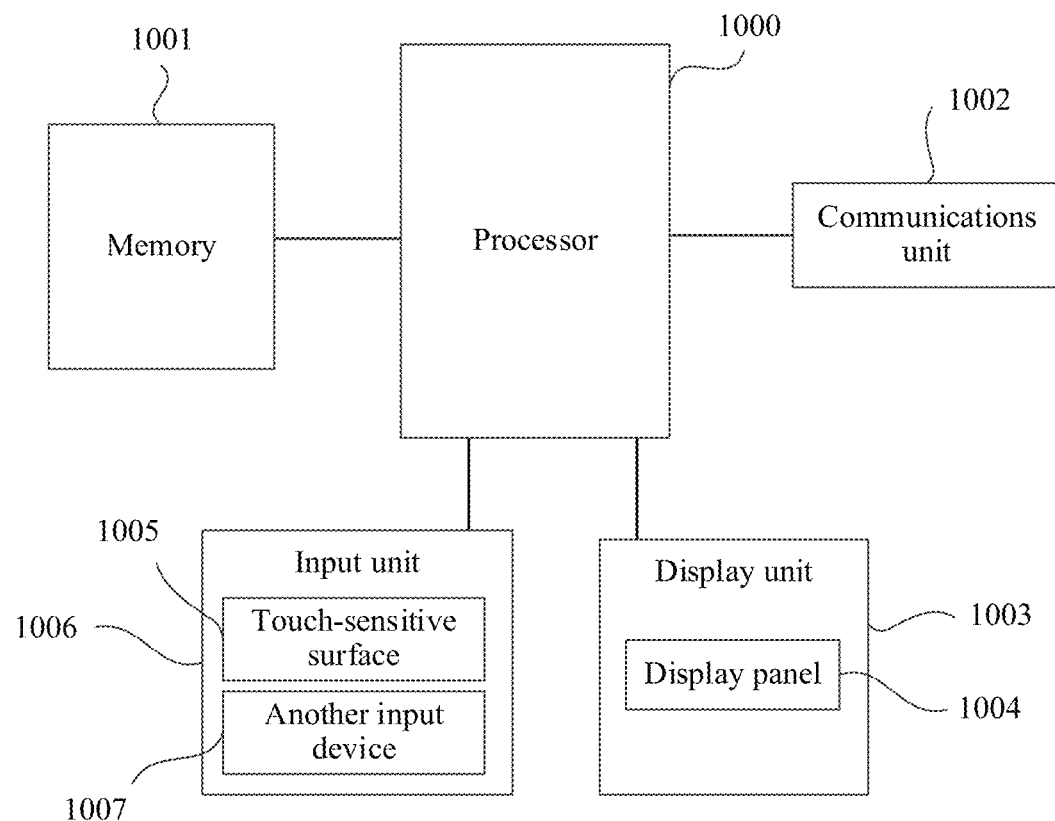
FIG. 10 is a block diagram of a retrieval apparatus according to an embodiment of this application.

FIG. 10 is a block structural diagram of a retrieval apparatus according to an embodiment of this application. As shown in FIG. 10, the retrieval apparatus may include one or more processors 1000 and one or more memories 1001. During implementation, the retrieval apparatus may further include components such as an input unit 1006, a display unit 1003, and a communications unit 1002. The processor 2011 may be separately connected to the components such as the memory 1001, the communications unit 1002, the input unit 1006, and the display unit 1003 through a bus. The details are as follows:

The processor 1000 is a control center of the retrieval apparatus, and connects the components of the retrieval apparatus through various interfaces and cables. In a possible embodiment, the processor 1000 may further includes one or more processing cores. The processor 1000 may read data stored in the memory 1001 and analyze and compare the data to perform a retrieval task. The processor 1000 may be a dedicated processor or a general-purpose processor. When the processor 1000 is the general-purpose processor, the processor 1000 runs or executes a software program (instruction) and/or module stored in the memory 1001.

The memory 1001 may include a high-speed random access memory, or a nonvolatile memory such as at least one magnetic disk storage device, a flash memory device, or another volatile solid-state storage device. Correspondingly, the memory 1001 may further include a memory controller to provide access to the memory 1001 for the processor 1000 and the input unit 1006. The memory 1001 may be specifically configured to store a software program (instruction) and data (related data in an acoustic model library and related data in a TTS parameter library).

The input unit 1006 may be configured to receive numerical or character information that is input by a user and generate an input from a keyboard, a mouse, a joystick, optics, or a trackball signal that is related to user setting and functional control. Specifically, the input unit 1006 may include a touch-sensitive surface 1005 and another input device 1007. The touch-sensitive surface 1005 is also referred to as a touch display screen or a touchpad and is configured to collect a touch operation of the user on or near the touch-sensitive surface 1005, and drive a corresponding connection apparatus according to a preset program. Specifically, another input device 1007 may include but is not limited to one or more of a physical keyboard, a trackball, a mouse, or a joystick.

The display unit 1003 may be configured to display a retrieval request input by the user or a retrieval result that provided by a retrieval apparatus and various graphical user interfaces of the retrieval apparatus. These graphical user interfaces may include a graph, text, an icon, a video, and any combination thereof. Specially, the display unit 1003 may include a display panel 1004. In one embodiment, the display panel 1004 may be configured in a form of a liquid crystal display (LCD), an organic light-emitting diode (OLED), or the like. Although in FIG. 10, the touch-sensitive surface 1005 and the display panel 1004 are used as two independent components, in some embodiments, the touch-sensitive surface 1005 and the display panel 1004 may be integrated to implement input and output functions. Further, the touch-sensitive surface 1005 may cover the display panel 1004. When detecting the touch operation on or near the touch-sensitive surface 1005, the touch-sensitive surface 1004 transmits the touch operation to the processor 1000 to determine a type of a touch event, and then the processor 1000 provides corresponding visual output on the display panel 1041 based on the type of the touch event.

The communications unit 1002 is configured to perform a communication connection with another device by using a wireless or wired communications technology, such as a cellular mobile communications technology, a WLAN, or Bluetooth. The communications unit 1002 is configured to receive a retrieval task request from an external system and return a retrieval result to the external system.

A person having ordinary skill in the art may understand that the retrieval apparatus in this embodiment of this application may include more or fewer components than those shown in the figure, or combine some components, or have different component arrangements. For example, the retrieval apparatus may further include a speaker, a camera, and the like. Details are not described herein.

Specifically, the processor 1000 may read and analyze data stored in the memory 1001, to implement the data reading method for a retrieval task in this embodiment of this application. Specifically, the processor 1000 receives a first retrieval task request; reads data of a first retrieval task starting from a first retrieval start address, receives a second retrieval task request in a process of reading data for the first retrieval task, obtains an address of data to be read for the first retrieval task after the second retrieval task request is received, and determines a second retrieval start address of a second retrieval task in a target data area based on the address of the data to be read. The second retrieval start address falls in a range from the address of the data to be read for the first retrieval task to a first retrieval end address. The processor 1000 reads data for the second retrieval task starting from the second retrieval start address.

Specifically, the processor 1000 may read, analyze, and determine data stored in the memory 1001, to implement a retrieval method according to an embodiment of this application. The processor 1000 receives a first retrieval task request; reads data of a first retrieval task starting from a first retrieval start address, receives a second retrieval task request in a process of reading data for the first retrieval task, determines a second retrieval start address of a second retrieval task in a target data area based on an address of data to be read for the first retrieval task. The second retrieval start address falls in a range from the address of the data to be read for the first retrieval task to a first retrieval end address. The processor 1000 sequentially reads data, determines the retrieval task corresponding to the read data, and performs retrieval based on the retrieval task corresponding to the read data.

For a data reading method for performing a retrieval task by the processor 1000 and a specific implementation process of the data retrieval method, refer to the foregoing method embodiments. Details are not described herein again.

It should be noted that, in one embodiment, when the modules in the embodiment in FIG. 4 or FIG. 5 are software modules, the memory 1001 may be further configured to store these software modules, and the processor 1000 may be configured to invoke and execute a software program (instruction) in the memory 1001 and/or these software modules, and read data stored in the memory 1001 to perform a retrieval task.

It should be further noted that, although FIG. 10 is merely an implementation of the retrieval apparatus in this application, the processor 1000 and the memory 1001 in the retrieval apparatus may alternatively be integrated in a possible embodiment.

All or some of the foregoing embodiments may be implemented by means of software, hardware, firmware, or any combination thereof. When software is used to implement the embodiments, the embodiments may be implemented completely or partially in a form of a computer program product. The computer program product includes one or more computer instructions. When the computer program instruction is loaded and executed, all or part of the procedures or functions are generated according to the embodiments of the application. The processor may be a general purpose processor or a dedicated processor. The retrieval apparatus may be one computer network, or may be a computer network including a plurality of retrieval apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, microwave, or the like) manner. The computer-readable storage medium may be any usable medium accessible by a computer, or a data storage device, such as a server or a data center that integrates one or more usable media. The usable medium may be a magnetic medium (for example, a floppy disk, a hard disk, a magnetic tape, or the like), an optical medium (for example, a DVD or the like), a semiconductor medium (for example, a solid-state drive), or the like.

For example, in one embodiment, an entity of executing the solution of this embodiment of this application may be an application-specific integrated circuit (ASIC), a field-programmable gate array (FPGA), a CPU, a GPU, or the like, and may be implemented in a hardware or software manner. In one embodiment, the memory may be a volatile or non-volatile storage device such as a double data rate (DDR), a static random-access memory (SRAM), a hard disk drive (HDD), or a solid state drive (SSD). The data retrieval apparatus may be applied to a plurality of scenarios, for example, a server used in a video surveillance system. For example, the data retrieval apparatus may be in a form of a peripheral component interconnected express (PCIe) expansion card.

The ASIC and the FPGA are hardware implementation. To be specific, the method in this application is implemented using a hardware description language during hardware design. The CPU and the GPU are implemented by using software. To be specific, the method in this application is implemented using software program code during software design.

In the foregoing embodiments, the description of each embodiment has respective focuses. For a part that is not described in detail in an embodiment, reference may be made to related descriptions in other embodiments.

What is claimed is:
1. A data reading method comprising:
  receiving a first retrieval task request corresponding to a first retrieval start address and a first retrieval end address in a target data area;
  reading data for a first retrieval task starting from the first retrieval start address, comprising sequentially reading data in the target data area from the first retrieval start address to the first retrieval end address;
  receiving a second retrieval task request in a process of reading data for the first retrieval task;
  determining a second retrieval start address of a second retrieval task in the target data area based on an address of data to be read for the first retrieval task, wherein the second retrieval start address falls in a range from the address of the data to be read for the first retrieval task to the first retrieval end address; and
  reading data for the second retrieval task starting from the second retrieval start address, wherein the target data area is a range of data that needs to be traversed when a retrieval is performed for both the first retrieval task and the second retrieval task.

2. The method according to claim 1, further comprising: determining a second retrieval end address of the second retrieval task in the target data area based on the address of the data to be read for the first retrieval task.

3. The method according to claim 1, wherein after the determining a second retrieval start address of the second retrieval task in the target data area based on an address of data to be read for the first retrieval task, the method further comprises: continuing to read data starting from the address of the data to be read for the first retrieval task to obtain a read data, and determining whether an address of the read data is the second retrieval start address, wherein if the address of the read data is the second retrieval start address, the read data is used to perform the second retrieval task.

4. The method according to claim 1, wherein after the determining a second retrieval start address of the second retrieval task in the target data area based on an address of data to be read for the first retrieval task, the method further comprises:
continuing to read data starting from the address of the data to be read for the first retrieval task to obtain a read data, and determining whether an address of the read data is the first retrieval end address, wherein if the address of the read data is not the first retrieval end address, the read data is further used to perform the first retrieval task.

5. The method according to claim 1, wherein the second retrieval task request corresponds to the second retrieval start address and a second retrieval end address in the target data area.

6. The method according to claim 1, wherein the determining a second retrieval start address of the second retrieval task in the target data area based on an address of data to be read comprises:
setting the address of the data to be read for the first retrieval task as the second retrieval start address, or setting a next address of the address of the data to be read for the first retrieval task as the second retrieval start address.

7. The method according to claim 1, further comprising determining a second retrieval end address of the second retrieval task in the target data area based on the address of the data to be read for the first retrieval task, comprising:
setting a previous data address of the address of the data to be read for the first retrieval task as the second retrieval end address, or
setting the address of the data to be read for the first retrieval task as the second retrieval end address.

8. A data retrieval apparatus comprising:
a processor; and
a memory coupled to the processor to store instructions, which when executed by the
processor, cause the processor to perform operations, the operations comprising:
receiving a first retrieval task request corresponding to a first retrieval start address and a first retrieval end address in a target data area, and receiving a second retrieval task request in a process of reading data for a first retrieval task;
determining a second retrieval start address of a second retrieval task in the target data area based on an address of data to be read for the first retrieval task, wherein the second retrieval start address falls in a range from the address of the data to be read for the first retrieval task to the first retrieval end address;
reading data for the first retrieval task starting from the first retrieval start address, comprising sequentially reading data in the target data area from the first retrieval start address to the first retrieval end address; and
reading data for a second retrieval task starting from the second retrieval start address; wherein
the target data area is a range of data that needs to be traversed when a retrieval is performed for both the first retrieval task and the second retrieval task.

9. The apparatus according to claim 8, wherein the operations further comprise:
continuing to read data starting from the address of the data to be read for the first retrieval task to obtain a read data; and
determining whether an address of the read data is the second retrieval start address, wherein if the address of the read data is the second retrieval start address, the read data is used to perform the second retrieval task.

10. The apparatus according to claim 8, wherein the operations further comprise: continuing to read data starting from the address of the data to be read for the first retrieval task to obtain a read data; and
determining whether the address of the read data is the first retrieval end address, wherein if the address of the read data is not the first retrieval end address, the read data is further used to perform the first retrieval task.

11. The apparatus according to claim 8, wherein the operations further comprise performing the retrieval based on the data read by the processor and a retrieval task corresponding to the read data.

12. The apparatus according to claim 8, wherein the operations further comprise determining a second retrieval end address of the second retrieval task in the target data area based on the address of the data to be read.

13. The apparatus according to claim 8, wherein determining a second retrieval start address of a second retrieval task in the target data area based on an address of data to be read comprises setting the address of the data to be read as the second retrieval start address.

14. The apparatus according to claim 12, wherein determining a second retrieval end address of a second retrieval task in the target data area based on an address of data to be read comprises
setting a previous data address of the address of the data to be read as the second retrieval end address.

15. A data retrieval system, wherein the system comprises a data retrieval apparatus and a memory, wherein
the memory is configured to store data required by a retrieval task of the data retrieval system, and the retrieval task of the data retrieval system needs to traverse the data in the memory; and
the data retrieval apparatus is configured to:
receive a first retrieval task request corresponding to a first retrieval start address and a first retrieval end address in the memory; read data for a first retrieval task starting from the first retrieval start address, comprising sequentially reading data in a target data area from the first retrieval start address to the first retrieval end address; receive a second retrieval task request in a process of reading data for the first retrieval task; determine a second retrieval start address of a second retrieval task in the memory based on an address of data to be read for the first retrieval task, wherein the second retrieval start address falls in a range from the address of the data to be read for the first retrieval task and the first retrieval end address; and read data for the second retrieval task starting from the second retrieval start address.

16. The system according to claim 15, wherein the data retrieval apparatus is further configured to, after determining the second retrieval start address of the second retrieval task in the target data area based on the address of the data to be read for the first retrieval task, continue to read data starting from the address of the data to be read for the first retrieval task to obtain a read data, and determine whether an address of the read data is the second retrieval start address, wherein if the address of the read data to be read is the second retrieval start address, the read data is used to perform the second retrieval task.

17. The system according to claim 15, wherein the data retrieval apparatus is further configured to, after determining the second retrieval start address of the second retrieval task in the target data area based on the address of the data to be read for the first retrieval task, continue to read data starting from the address of the data to be read for the first retrieval task to obtain a read data, and determine whether an address of the read data is the first retrieval start address, wherein if the address of the read data is not the first retrieval end address, the read data is further used to perform the first retrieval task.

18. The system according to claim 15, wherein the data retrieval apparatus is further configured to determine a second retrieval end address of the second retrieval task in the target data area based on the address of the data to be read for the first retrieval task.

19. The system according to claim 15, wherein the data retrieval apparatus is configured to:
   set the address of the data to be read as the second retrieval start address, or set a next address of the address of the data to be read for the first retrieval task as the second retrieval start address.

20. The system according to claim 15, wherein the data retrieval apparatus is further configured to determine a second retrieval end address of the second retrieval task in the target data area based on the address of the data to be read for the first retrieval task, wherein the data retrieval apparatus is further configured to:
   set, by the data retrieval apparatus, a previous data address of the address of the data to be read as the second retrieval end address; or
   set the address of the data to be read for first retrieval task as the second retrieval end address.

* * * * *